United States Patent
Zheng et al.

(10) Patent No.: US 10,173,709 B2
(45) Date of Patent: Jan. 8, 2019

(54) PALLET TRUCK HANDLE ASSEMBLY

(71) Applicant: Big Lift, LLC, Lombard, IL (US)

(72) Inventors: Wang Zheng, Hangzhou (CN); Yang Yanfeng, Hangzhou (CN); Cao Jinsong, Hangzhou (CN)

(73) Assignee: BIG LIFT, LLC, Lombard, IL (US)

( * ) Notice: Subject to any disclaimer, the term of this patent is extended or adjusted under 35 U.S.C. 154(b) by 234 days.

(21) Appl. No.: 15/429,328

(22) Filed: Feb. 10, 2017

(65) Prior Publication Data

US 2018/0229749 A1 Aug. 16, 2018

(51) Int. Cl.
| | |
|---|---|
| *B62B 5/06* | (2006.01) |
| *B62B 3/06* | (2006.01) |
| *B62B 3/10* | (2006.01) |
| *B62B 3/02* | (2006.01) |
| *F16C 1/10* | (2006.01) |
| *F16C 1/22* | (2006.01) |

(52) U.S. Cl.
CPC ............... *B62B 5/063* (2013.01); *B62B 3/02* (2013.01); *B62B 3/06* (2013.01); *B62B 3/0612* (2013.01); *B62B 3/10* (2013.01); *B62B 5/067* (2013.01); *F16C 1/101* (2013.01); *F16C 1/223* (2013.01)

(58) Field of Classification Search
CPC .. B62B 3/001; B62B 3/02; B62B 5/06; B62B 5/063; B62K 21/12; B62K 21/18; F16C 1/101; F16C 1/102; F16C 1/26; B66F 9/07568; B62D 1/14; B62D 1/12
See application file for complete search history.

(56) References Cited

U.S. PATENT DOCUMENTS

| | | | | |
|---|---|---|---|---|
| 4,573,543 A | * | 3/1986 | Bataille .............. | B62D 51/002 180/19.1 |
| 5,816,614 A | * | 10/1998 | Kramer, Jr. ............. | B62D 1/14 280/775 |
| 6,783,147 B1 | * | 8/2004 | Green, Sr. ................ | B62B 1/20 280/47.26 |
| 7,025,157 B2 | | 4/2006 | Lindsay et al. | |
| 8,467,937 B2 | * | 6/2013 | Hanna .................... | B62B 5/063 180/19.1 |

(Continued)

FOREIGN PATENT DOCUMENTS

| | | | | |
|---|---|---|---|---|
| CA | 1105894 A | * | 7/1981 | ........... B62B 3/0618 |
| GB | 2190063 A | * | 11/1987 | ............... B62B 5/04 |

*Primary Examiner* — Richard W Ridley
*Assistant Examiner* — Brian J McGovern
(74) *Attorney, Agent, or Firm* — Cook Alex Ltd.

(57) ABSTRACT

A pallet truck handle assembly is provided, including a handle hinge seat, a handle control head, and a removable handle tube having a first end and a second end. The first end of the removable handle tube is removably connected to the handle hinge seat by one or more fasteners, and the second end of the removable handle tube is connected to the handle control head. The handle assembly further includes a handle control cable or handle wiring harness having a first end and a second end. The first end of the handle control cable or handle wiring harness is located proximate the first end of the removable handle tube and the second end of the handle control cable or handle wiring harness is connected to the handle control head, and the handle hinge seat has a support member that receives a chassis control cable or a chassis wiring harness.

17 Claims, 8 Drawing Sheets

(56) References Cited

U.S. PATENT DOCUMENTS

| | | | |
|---|---|---|---|
| 2003/0029648 A1* | 2/2003 | Trego | B62D 51/001 180/19.1 |
| 2005/0160873 A1* | 7/2005 | Chang | B62D 1/12 74/551.4 |
| 2014/0262593 A1* | 9/2014 | Castaneda | B62D 5/046 180/446 |
| 2016/0023872 A1* | 1/2016 | Liu | B62B 3/0612 254/2 R |
| 2016/0101794 A1* | 4/2016 | Fowler | B66F 9/18 254/2 R |
| 2017/0120941 A1* | 5/2017 | Pan | B62B 5/0043 |

* cited by examiner

PALLET TRUCK HANDLE ASSEMBLY

TECHNICAL FIELD

The present invention relates to pallet truck constructions and particularly to constructing a pallet truck that permits quick disassembly of a handle assembly for more compact shipping of the pallet truck and convenient reassembly for use. Compared to the prior art, the invention solves problems relating to bulky and higher cost shipping of pallet trucks having a handle assembly installed, and complications involved when trying to provide a handle assembly that can be disassembled and reassembled upon delivery.

BACKGROUND

Traditional pallet truck constructions include a handle assembly that is connected to a chassis at a hinge. The handle assembly typically includes a handle tube, with a handle control head, often referred to as a tiller head, connected to an upper end of the handle tube and a handle hinge seat connected to the lower end of the handle tube. In a traditional pallet truck, the handle tube usually is welded to the handle hinge seat. The handle hinge seat is one pivotal portion of a hinge that connects the handle assembly to the pallet truck chassis, by using a hinge pin and one or more clips or other fasteners to complete the hinge. Some pallet trucks are operated entirely manually, while others may include electrical features, such as may be used in driving the pallet truck, in operating a load lift portion having forks, or monitoring battery discharge. Depending on whether a pallet truck is entirely manually operated or includes electrical features, the pallet truck may include one or more cables and/or a wiring harness or one or more wires that are directly connected at a first end to respective components on the chassis, such as a cable operated load lift release valve to effectively lower the pallet truck forks or an electric motor to drive the pallet truck or to operate a lift. The second end of the one or more cables and/or a wiring harness or one or more wires extend from the chassis, are threaded through the handle tube, and are connected to the handle control head.

In an effort to reduce the volume and transportation costs required when shipping a traditional pallet truck, it would be desirable to remove and alternatively pack the handle assembly. However disassembly of the handle assembly from the chassis of a traditional pallet truck is complicated and typically requires removal of covers from the pallet truck to access the handle hinge, as well as removal of the handle hinge pin to be able to separate from the remainder of the hinge the handle hinge seat that is welded to the handle tube. Disassembly also would require disconnection of the cable(s) and/or wiring harness or wires from the handle control head or from components on the chassis, and then rearranging of the cable(s) and/or wiring harness or wires to prepare for shipping. In some instances a cover must be removed to access and disconnect a gas spring that helps to support and dampen movement of the handle assembly when being moved from an upright position to a position for use. Upon delivery of the pallet truck, the disassembled handle assembly is difficult for customers to reinstall. The handle hinge seat and hinge pin must be reinstalled and clips or fasteners connected, and the lengthy cable(s) and/or wiring harness or wires must be unpacked, rearranged and rethreaded through the handle tube and connected to the handle control head, and covers reset in place.

SUMMARY

The subject matter of this disclosure provides advantages over typical pallet trucks by providing a handle assembly that permits fast, simple and convenient disassembly from the chassis, and fast and easy reassembly. The handle assembly includes a removable handle tube, with a handle control head connected to one end of the removable handle tube, and a handle hinge seat removably connected to the other end of the removable handle tube. The handle hinge seat is still considered to be part of the handle assembly, but the removable handle tube is easily connected to and disconnected from the handle hinge seat by one or more fasteners. The handle hinge seat stays assembled to the remainder of the handle hinge on the chassis of the pallet truck, so the hinge pin does not need to be removed to remove the removable handle tube and handle control head.

The handle hinge seat includes a support member that supports at least one chassis control cable and/or a chassis wiring harness, if the handle control head features electrical controls. The handle tube includes a handle control cable and/or handle wiring harness that are connected to the handle control head and that extend from the handle tube for quick and convenient connection to the corresponding chassis control cable and/or chassis handle wiring harness. The handle control cable also may be easily adjusted to ensure that the length is appropriate for proper operation.

The handle assembly preferably may include a bumper that provides a cushioned stop when the handle assembly is rotated via the hinge to an upright position. In the example shown, the bumper preferably also includes a fastener that is used to connect the bumper to a front face of the handle hinge seat and to connect the control cable support to the a rear face of the handle hinge seat. The control cable support preferably includes a chassis control cable mounting slot that holds the chassis control cable. The control cable support preferably also may include a chassis wiring harness mounting slot that holds the chassis wiring harness.

The handle tube preferably is quickly connected to the handle hinge seat by one or more fasteners, such as screws. For ease of assembly, the handle hinge seat preferably is constructed with a U-shaped portion that slides into an end of the handle tube. The handle control cable also preferably is connected to the chassis control cable by a cable end connector in the form of a cable buckle assembly.

The disclosed subject matter is advantageous because disassembly of the handle assembly does not require removal of covers on the pallet truck chassis. Nor is there a need to rearrange the layout of a cable, wiring harness or individual wires. This saves time when preparing a pallet truck for shipment, as well as during set up of a pallet truck once it has been delivered. In addition, this permits the entire handle tube and handle control head to be conveniently removed, whereas some traditional pallet trucks simply do not permit convenient, temporary removal of a handle control head or handle tube. This can be particularly advantageous for a pallet truck that includes electrical controls, such as a battery discharge indicator.

It is advantageous to be able to leave the handle hinge pin fully assembled and to quickly and easily disassemble the handle tube from the handle hinge seat. This is facilitated by having a separate handle control cable and/or handle wiring harness that are connected to a chassis control cable and/or a chassis wiring harness, rather than having the chassis control cable and/or chassis wiring harness extend in an uninterrupted manner from their origin, threaded through the handle tube and to the handle control head. The control cable support securely mounts the chassis control cable and the chassis wiring harness and positions them for quick and convenient connection to the handle control cable and/or handle wiring harness, as well as for adjustment of the handle control cable to maintain appropriate cable tension.

In a first aspect, a pallet truck handle assembly is provided, including a handle hinge seat, a handle control head, and a removable handle tube having a first end and a second end. The first end of the removable handle tube is removably connected to the handle hinge seat by one or more fasteners, and the second end of the removable handle tube is connected to the handle control head. The handle assembly further includes a handle control cable or handle wiring harness having a first end and a second end. The first end of the handle control cable or handle wiring harness is located proximate the first end of the removable handle tube and the second end of the handle control cable or handle wiring harness is connected to the handle control head, and the handle hinge seat has a support member that receives a chassis control cable or a chassis wiring harness.

It is to be understood that both the foregoing general description and the following detailed description are exemplary and provided for purposes of explanation only, and are not restrictive with respect to the claimed subject matter. Use of the term "or" herein is to be understood as meaning "and/or". Further features and advantages will become more fully apparent in the following description of the example preferred embodiment and from the appended claims.

BRIEF DESCRIPTION OF THE DRAWINGS

In describing the preferred examples, references are made to the accompanying drawing figures wherein like parts have like reference numerals. For ease of viewing and comprehension, the figures may show certain features in a simplified manner.

It should be understood that the drawings are not necessarily to scale. While some details of the pallet truck handle assembly, and other plan and section views of the particular components have been omitted, such details are considered to be within the comprehension of those skilled in the art in light of the present disclosure. It also should be understood that the present disclosure is not limited to the examples illustrated and described.

DETAILED DESCRIPTION OF THE PREFERRED EMBODIMENT

Figure 1:
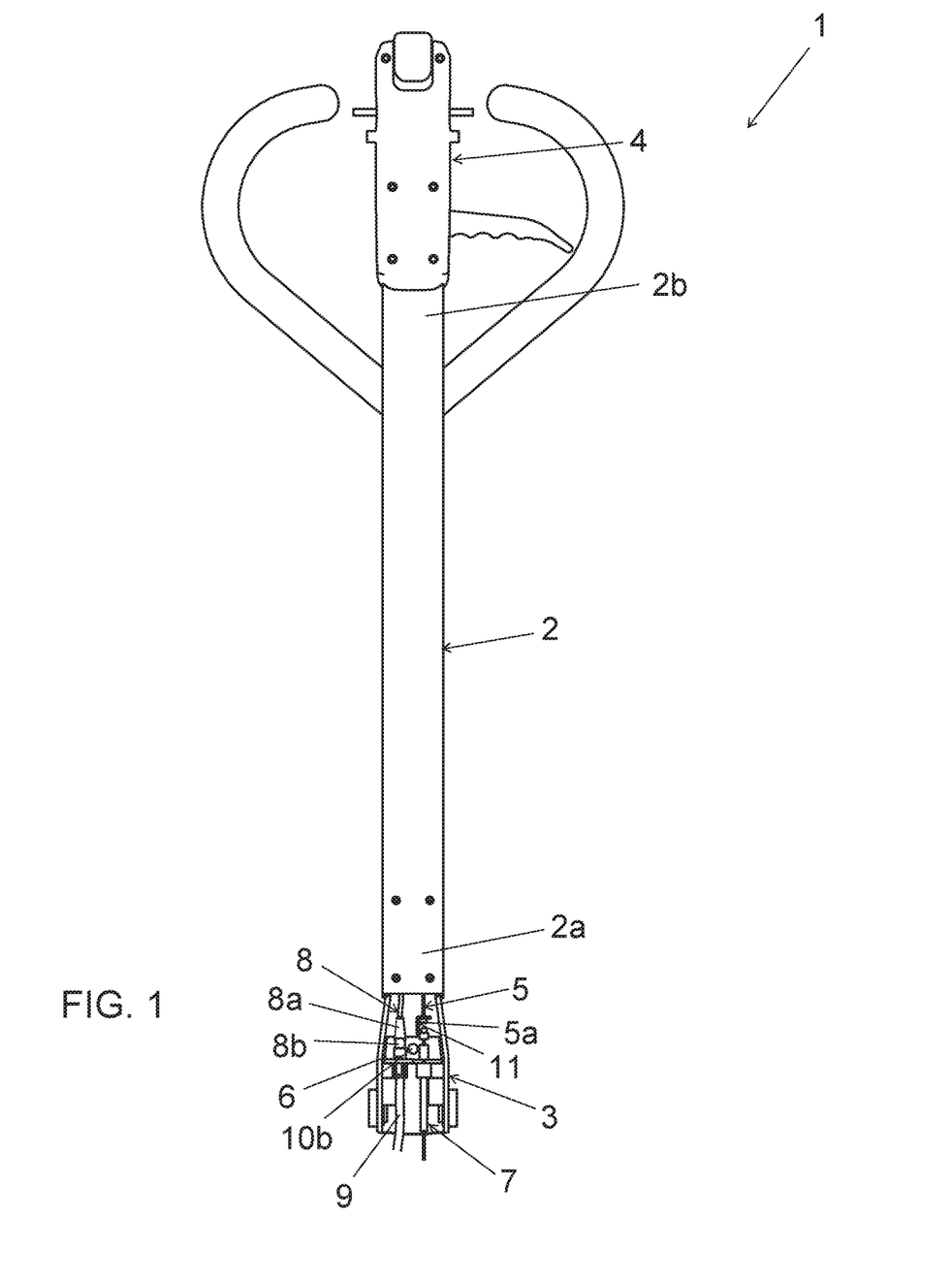
FIG. 1 shows a rear view of a handle assembly including a handle hinge seat, a removable handle hinge tube and a handle control head.
Figure 2:
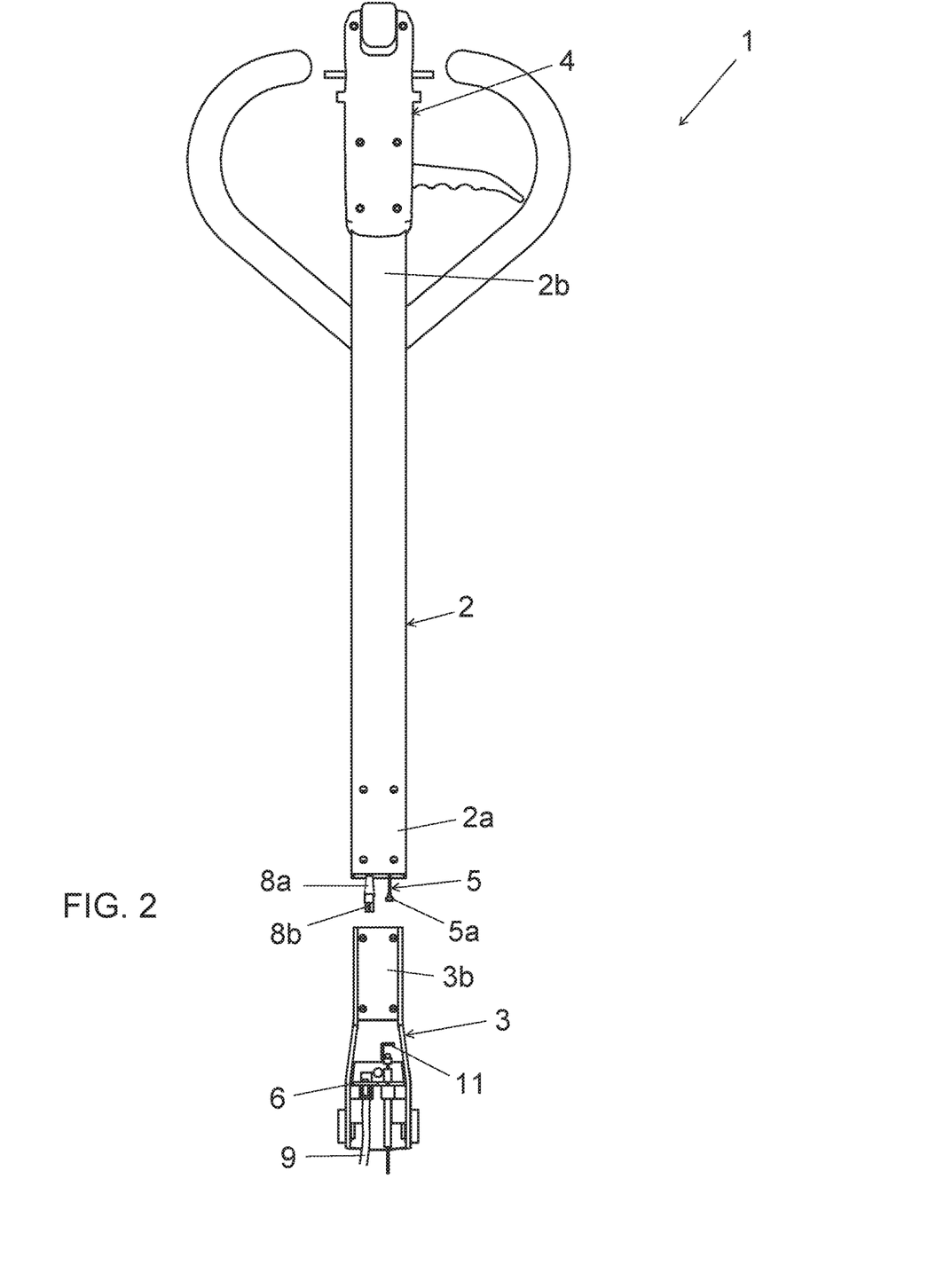
FIG. 2 shows a rear view of the handle assembly of FIG. 1 with the removable handle tube disassembled from the handle hinge seat, including disconnection of a handle control cable from a chassis control cable and disconnection of a handle wiring harness from a chassis wiring harness.
Figure 3:
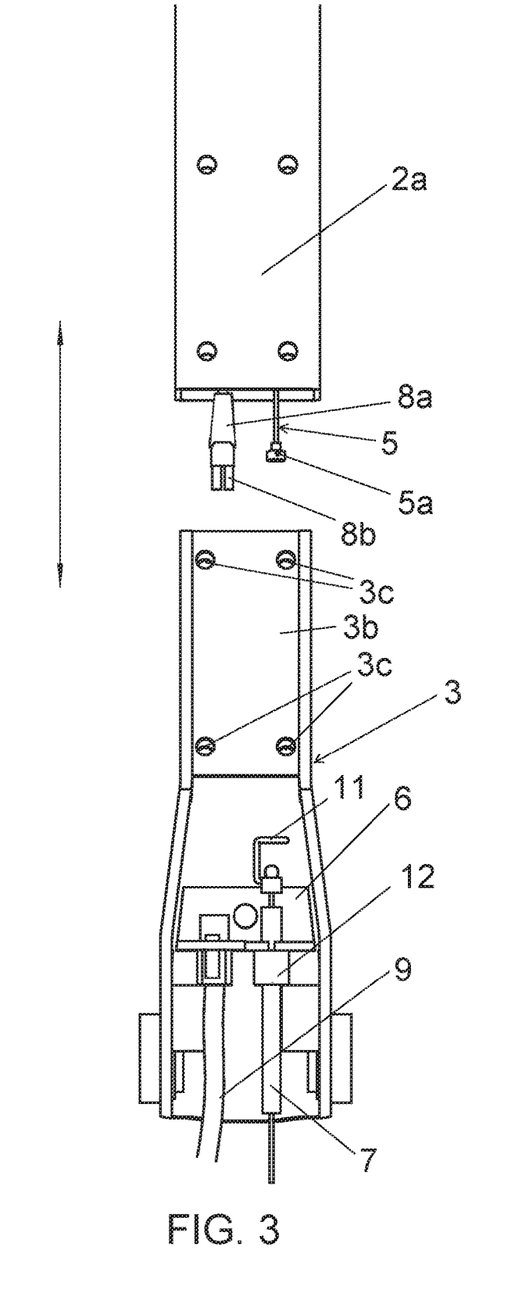
FIG. 3 is a close-up rear view of the portion of the removable handle tube that is disassembled from the handle hinge seat shown in FIG. 2.
Figure 4:
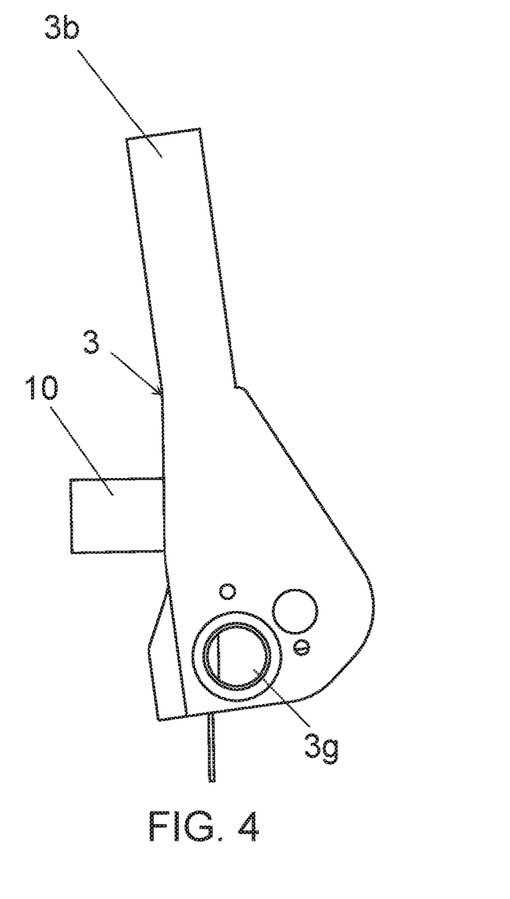
FIG. 4 is a side view of the handle hinge seat shown in FIGS. 1-3, including a bumper connected to a front face of the handle hinge seat.
Figure 5:
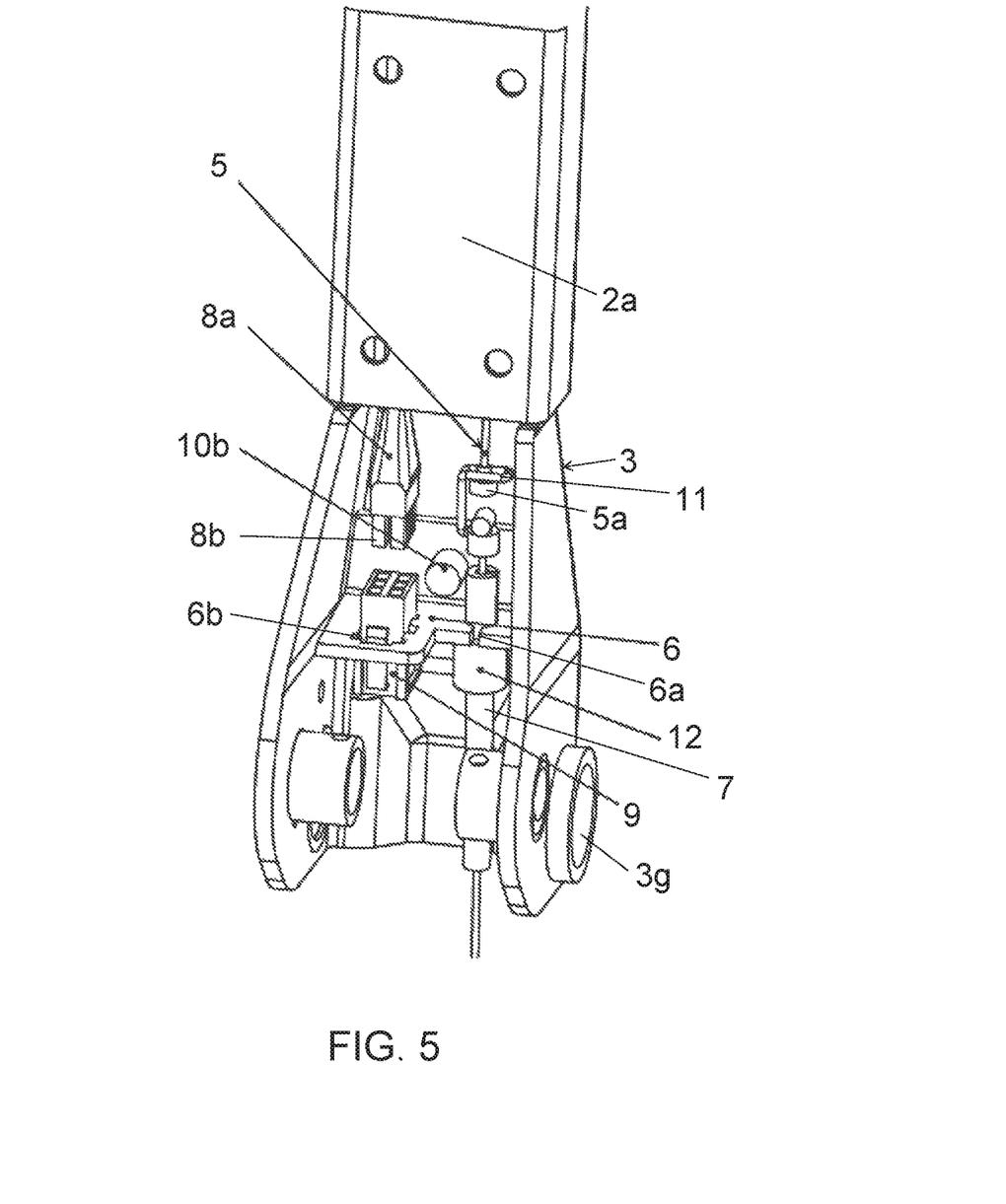
FIG. 5 is a close-up rear perspective view of the handle tube that is assembled to the handle hinge seat shown in FIGS. 1-3.
Figure 6:
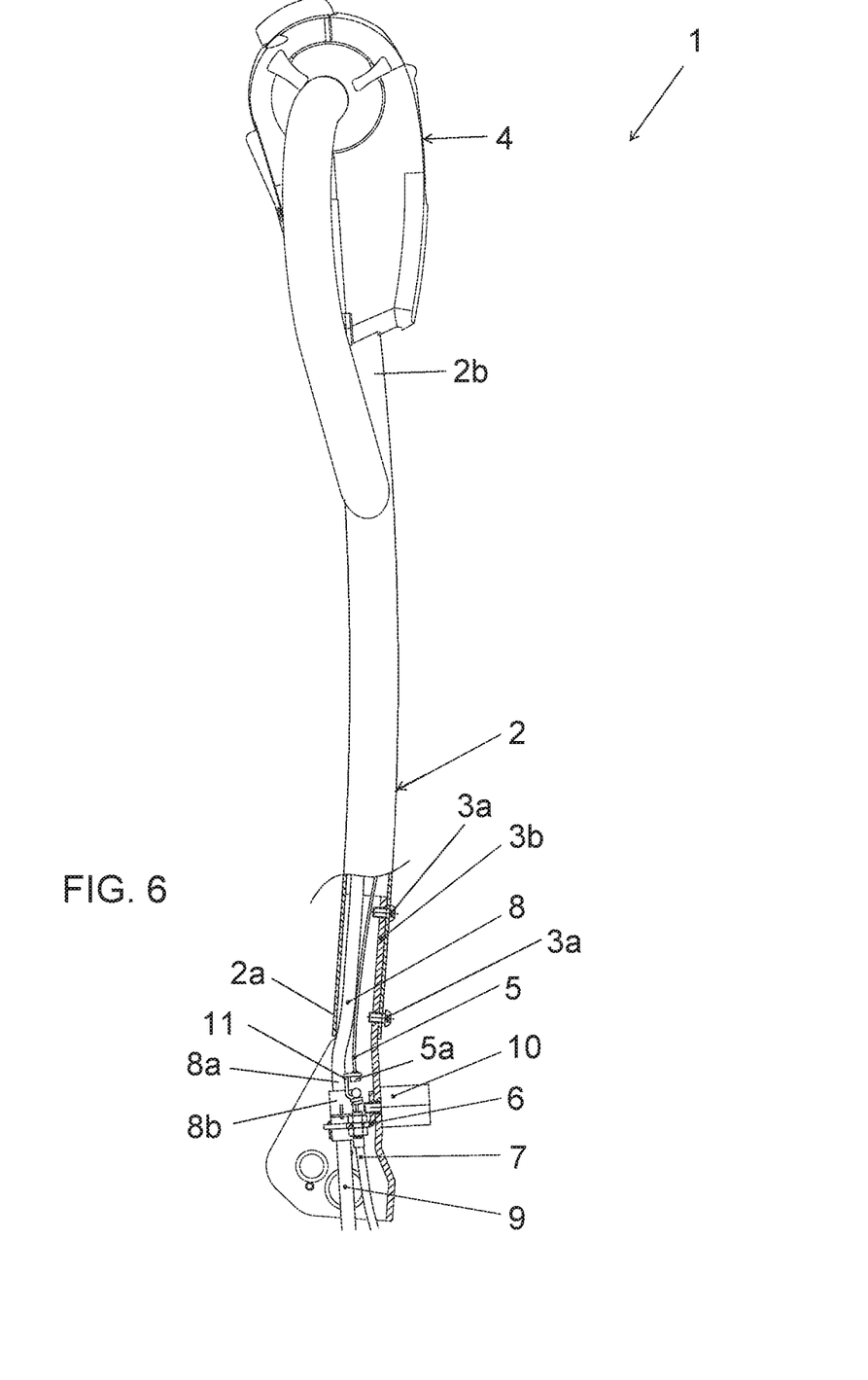
FIG. 6 is a side view of the handle assembly of FIG. 1 with a cutaway portion.
Figure 7:
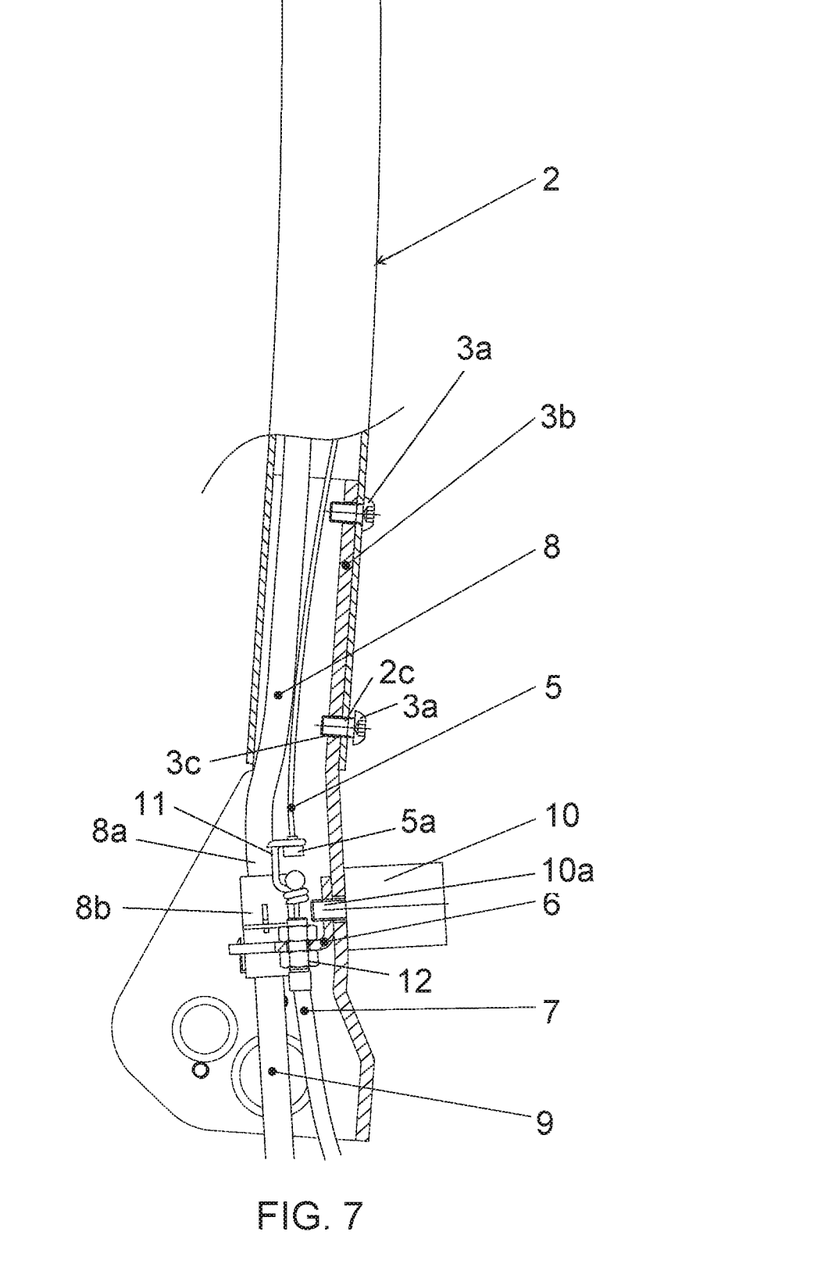
FIG. 7 is a close-up side view of the cutaway portion shown in FIG. 6.
Figure 8:
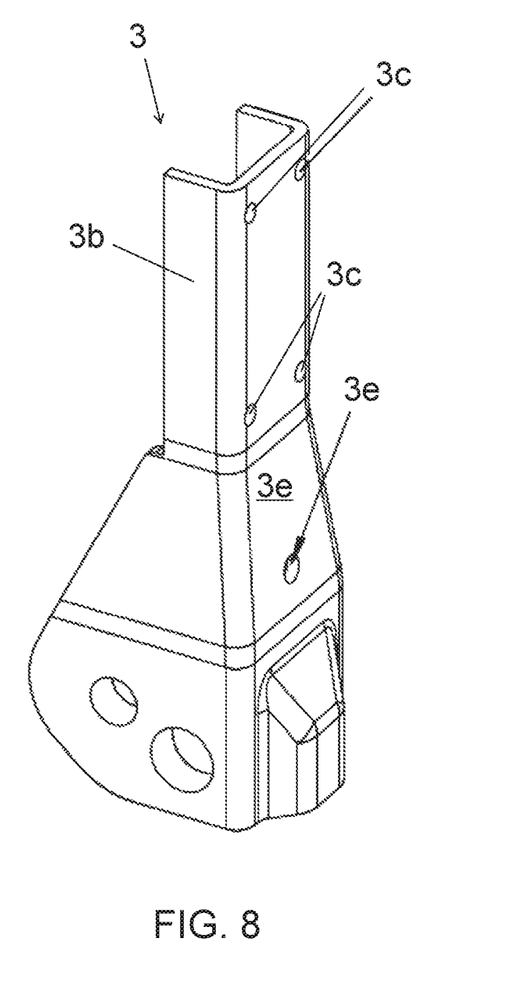
FIG. 8 is a front perspective view of the handle hinge seat shown in FIGS. 1-5, without a bumper connected to the front face of the handle hinge seat.
Figure 9:
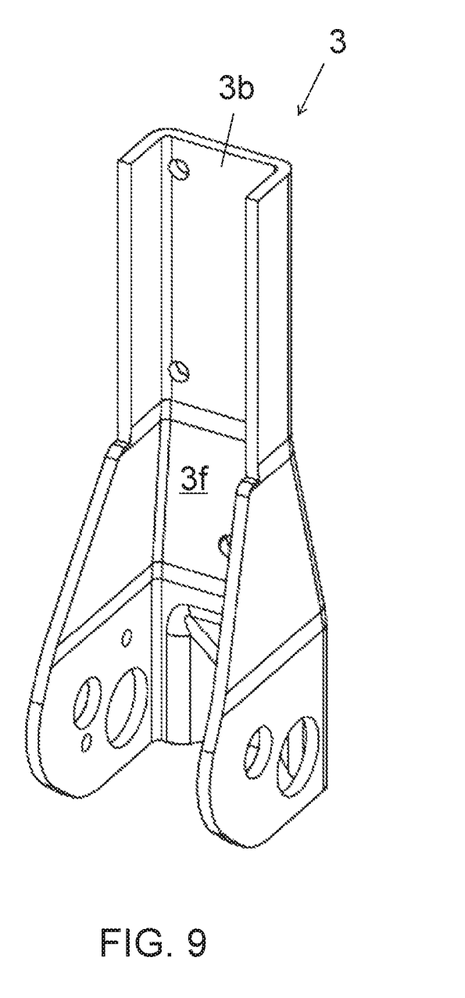
FIG. 9 is a rear perspective view of the handle hinge seat shown in FIGS. 1-5 and 8, without a support member connected to the rear race of the handle hinge seat.
Figure 10:
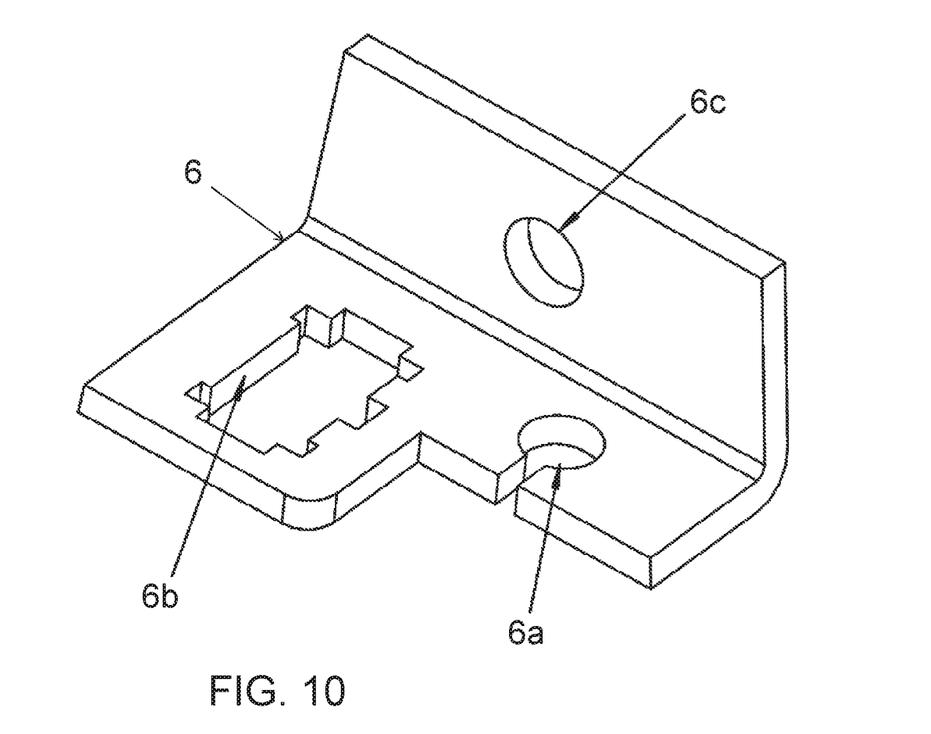
FIG. 10 shows a rear perspective view of the support member.
Figure 11:
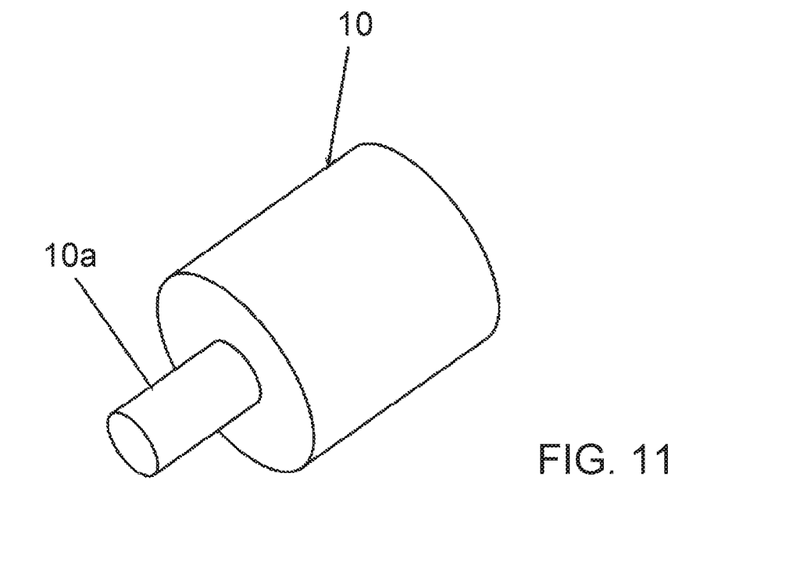
FIG. 11 shows a rear perspective view of the bumper shown in FIG. 4, with a simplified representation of the shaft, which provides a fastener for connecting the bumper to the front face of the handle hinge seat and the support member to the rear face of the handle hinge seat.

This disclosure provides solutions to the technical problems presented by pallet trucks having handle assemblies that are difficult to remove for more compact and cost effective shipping, and further that are complicated and difficult to reassemble to the pallet truck chassis upon delivery. An example of a pallet truck handle assembly 1 that is constructed for quick and easy disassembly from the pallet truck chassis and convenient reassembly is shown in FIGS. 1-11.

As seen in FIGS. 1-3 and 5-7, the pallet truck handle assembly 1 includes a handle hinge seat 3, a handle control head 4, and a removable handle tube 2 having a first end 2a and a second end 2b. The first end 2a of the removable handle tube 2 is connected to the handle hinge seat 3 by one or more fasteners 3a. The second end 2b of the removable handle tube 2 is connected to the handle control head 4. The pallet truck handle assembly 1 further includes a handle control cable 5 or handle wiring harness 8 having a first end and a second end. The first end 5a, 8a of the handle control cable or handle wiring harness is located proximate the first end 2a of the removable handle tube 2 and the second end of the handle control cable or handle wiring harness is connected to the handle control head 4. The handle hinge seat 3 has a support member 6 that receives a chassis control cable 7 or a chassis wiring harness 9. The handle control cable 5 may be connected, for instance, to a manual lever that may be operated to actuate a release to lower the lift portion of the pallet truck, which would include the pallet truck forks.

In the example shown, the support member 6 is constructed as a plate that is connected to the handle hinge seat. The support member 6 may be constructed of rigid material, that may be similar to or different from the rigid material used for the removable handle tube 2 and the handle hinge seat 3, such as steel or other metals or rigid materials. In this example, the support 6 member holds a chassis control cable 7 in position for disconnection from and connection to the first end 5a of the handle control cable 5. The support member 6 includes a mounting slot 6a to hold the chassis control cable 7. In this example, the support member 6 also holds a chassis wiring harness 8 in a position for disconnection from and connection to a first end 8a of the handle wiring harness 8. The support member 6 also includes a mounting slot 6b to hold the chassis wiring harness 9. The support member 6 may be configured to hold a chassis control cable 7 or a chassis wiring harness 9, meaning that the support member 6 may be configured to hold either or both a chassis control cable 7 in a position for disconnection from and connection to the first end 5a of the handle control cable 5 and a chassis wiring harness 9 in a position for disconnection from and connection to the first end 8a of the handle wiring harness 8.

The removable handle tube 2 is connected to the handle hinge seat 3 by a plurality of fasteners 3a. As may be best seen in FIGS. 3 and 7-9, the handle hinge seat 3 includes a U-shaped portion 3b that is removably connected to the first end 2a of the removable handle 2. In this example, the U-shaped portion 3b of the handle hinge seat 3 is slidably received in the first end 2a of the removable handle tube 2 for connection thereto. The U-shaped portion 3b of the handle hinge seat 3 further includes a plurality of threaded holes 3c (shown for ease of display simply as holes) and the removable handle tube 2 includes a corresponding plurality of through holes 2c that when aligned with the threaded holes 3c in the U-shaped portion 3b of the handle hinge seat 3, receive the plurality of fasteners 3a and connect the removable handle tube 2 to the handle hinge seat 3.

The pallet truck handle assembly 1 further includes a bumper 10 connected to a front face 3d of the handle hinge seat 3. The bumper 10 also includes a portion of a fastener 10a that extends from the bumper 10 and through the handle hinge seat 3 and is used to connect the control cable support 6 to the handle hinge seat 3. The portion of a fastener 10a that extends from the bumper 10 is shown in a simplified way for ease of viewing, but may include, for example, a threaded shaft that extends through a through hole 3e in the handle hinge seat 3 and a through hole 6c in the support member 6 and then receives a threaded nut 10b, also shown in a simplified manner, to connect the control cable support 6 to a rear face 3f of the handle hinge seat 3. It will be appreciated that alternative suitable ways of fastening a bumper and a support member to the handle hinge seat may be used, such as by extending a bolt through the support member and into a threaded insert in a bumper, or by welding the support member to the handle hinge seat and separately connecting the bumper to the handle hinge seat, or the like. It also will be appreciated that the handle hinge seat 3 would remain connected to by a hinge pin to another portion of the hinge that would be connected to the pallet truck chassis, with the hinge pin rotatably mounted within a hinge journal 3g of the handle hinge seat 3.

The handle wiring harness 8 includes a connector 8b at its first end 8a that permits quick connection to and disconnection from the chassis wiring harness 9. The first end 5a of the handle control cable 5 includes a connector that permits quick connection to and disconnection from a chassis control cable 7. In this example, the connector at the first end 5a of the handle control cable 5 is connected to and disconnected from the chassis control cable 7 via a cable connector buckle 11. The support member 6 may include an adjuster 12 that permits adjustment of tension in the chassis control cable 7 or handle control cable 5, to ensure proper operation.

The above description is provided with respect to preferred examples of the pallet truck handle assembly. It will be appreciated, however, that the invention may be constructed and configured in various ways and is not limited to the specific examples shown and described herein. Thus, the present disclosure presents alternatives to traditional handle assemblies on pallet trucks in the prior art. The inventive pallet truck handle assembly provides advantageous features by permitting quick and convenient disassembly from and connection to a pallet truck chassis. This results in more compact and lower cost shipping, while presenting easy reassembly upon delivery of the pallet truck.

It will be appreciated that the present disclosure shows and demonstrates preferred examples of pallet truck handle assemblies that are merely illustrative and are not to be considered limiting. It will be apparent to those of ordinary skill in the art that the handle assemblies may be constructed and configured for use with various pallet trucks, without departing from the scope or spirit of the present disclosure. Thus, although examples pallet truck handle assemblies have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A pallet truck handle assembly, comprising:
   a handle hinge seat;
   a handle control head;
   a removable handle tube having a first end and a second end;
   the first end of the removable handle tube is removably connected to the handle hinge seat by one or more fasteners;
   the second end of the removable handle tube is connected to the handle control head;
   a handle control cable or handle wiring harness having a first end and a second end;
   the first end of the handle control cable or handle wiring harness is located proximate the first end of the removable handle tube and the second end of the handle control cable or wiring harness is connected to the handle control head; and
   the handle hinge seat has a support member that receives a chassis control cable or a chassis wiring harness.

2. The pallet truck handle assembly of claim 1, wherein the support member is constructed as a plate that is connected to the handle hinge seat.

3. The pallet truck handle assembly of claim 1, wherein the support member holds the chassis control cable in position for disconnection from and connection to the first end of the handle control cable.

4. The pallet truck handle assembly of claim 3, wherein the support member includes a mounting slot to hold the chassis control cable.

5. The pallet truck handle assembly of claim 1, wherein the support member holds the chassis wiring harness in position for disconnection from and connection to the first end of the handle wiring harness.

6. The pallet truck handle assembly of claim 5, wherein the support member includes a mounting slot to hold the chassis wiring harness.

7. The pallet truck handle assembly of claim 1, wherein the support member holds the chassis control cable in position for disconnection from and connection to the first end of the handle control cable and holds the chassis wiring harness in position for disconnection from and connection to the first end of the handle wiring harness.

8. The pallet truck handle assembly of claim 1, wherein the one or more fasteners includes a plurality of fasteners.

9. The pallet truck handle assembly of claim 1, wherein the handle hinge seat further comprises a U-shaped portion that is removably connected to the first end of the removable handle tube.

10. The pallet truck handle assembly of claim 9, wherein the U-shaped portion of the handle hinge seat is slidably received in the first end of the removable handle tube.

11. The pallet truck handle assembly of claim 9, wherein the U-shaped portion of the handle hinge seat further comprises a plurality of threaded holes and the removable handle tube includes a corresponding plurality of through holes that when aligned with the threaded holes in the U-shaped portion of the handle hinge seat, receive the one or more fasteners and connect the removable handle tube to the handle hinge seat.

12. The pallet truck handle assembly of claim 1, further comprising a bumper connected to a front face of the handle hinge seat.

13. The pallet truck handle assembly of claim 12, wherein the bumper further comprises a portion of a fastener that extends through the handle hinge seat and is used to connect the support member to the handle hinge seat.

14. The pallet truck handle assembly of claim 1, wherein the first end of the handle wiring harness includes a connector that permits connection to and disconnection from a chassis wiring harness.

15. The pallet truck handle assembly of claim 1, wherein the first end of the handle control cable includes a connector that permits connection to and disconnection from a chassis control cable.

16. The pallet truck handle assembly of claim 15, wherein the connector at the first end of the handle control cable is connected to and disconnected from the chassis control cable via a cable connector buckle.

17. The pallet truck handle assembly of claim 15, wherein the control cable support includes an adjuster that permits adjustment of tension in the chassis control cable or handle control cable.

\* \* \* \* \*